United States Patent

Rodemer

(10) Patent No.: US 8,996,383 B2
(45) Date of Patent: Mar. 31, 2015

(54) MOTOR-VEHICLE VOICE-CONTROL SYSTEM AND MICROPHONE-SELECTING METHOD THEREFOR

(75) Inventor: Klaus Rodemer, Lautertal (DE)

(73) Assignee: paragon AG, Delbrueck (DE)

( * ) Notice: Subject to any disclaimer, the term of this patent is extended or adjusted under 35 U.S.C. 154(b) by 510 days.

(21) Appl. No.: 13/405,270

(22) Filed: Feb. 25, 2012

(65) Prior Publication Data

US 2012/0221341 A1 Aug. 30, 2012

(30) Foreign Application Priority Data

Feb. 26, 2011 (DE) .......................... 10 2011 012 573

(51) Int. Cl.
| | |
|---|---|
| *G10L 21/00* | (2013.01) |
| *G10L 25/00* | (2013.01) |
| *H04R 3/00* | (2006.01) |
| *G10L 21/0264* | (2013.01) |
| *G10L 15/20* | (2006.01) |
| *G10L 21/0216* | (2013.01) |

(52) U.S. Cl.
CPC ............. *G10L 21/0264* (2013.01); *G10L 15/20* (2013.01); *G10L 2021/02166* (2013.01)
USPC .......................................... 704/270; 381/92

(58) Field of Classification Search
USPC .................... 704/270–275; 381/92
See application file for complete search history.

(56) References Cited

U.S. PATENT DOCUMENTS

| | | | | |
|---|---|---|---|---|
| 5,633,935 | A * | 5/1997 | Kanamori et al. | 381/26 |
| 6,600,824 | B1 * | 7/2003 | Matsuo | 381/92 |
| 6,748,088 | B1 * | 6/2004 | Schaaf | 381/92 |
| 7,116,791 | B2 * | 10/2006 | Matsuo | 381/92 |
| 7,394,907 | B2 * | 7/2008 | Tashev | 381/92 |
| 8,054,988 | B2 * | 11/2011 | Schultz et al. | 381/86 |
| 8,682,675 | B2 * | 3/2014 | Togami et al. | 704/274 |
| 2002/0090094 | A1 * | 7/2002 | Amir et al. | 381/92 |
| 2002/0097885 | A1 * | 7/2002 | Birchfield et al. | 381/92 |
| 2006/0251261 | A1 * | 11/2006 | Christoph | 381/1 |
| 2006/0282204 | A1 * | 12/2006 | Breed | 701/49 |
| 2012/0051548 | A1 * | 3/2012 | Visser et al. | 381/56 |
| 2012/0140947 | A1 * | 6/2012 | Shin | 381/92 |

* cited by examiner

*Primary Examiner* — Olujimi Adesanya
(74) *Attorney, Agent, or Firm* — Andrew Wilford

(57) ABSTRACT

A voice-control system for motor vehicles has a plurality of spaced microphones emitting respective microphone signals, and an evaluation unit connected to the microphones. This unit serves for assembling correlation pairs from the signals of two of the microphones, calculating a correlation coefficient for each correlation pair, detecting an energy value for each microphone, detecting a respective delay time of a voice signal between a voice signal source and the each of the microphones, and selecting in dependence on current correlation coefficients of the correlation pairs, on the current energy values of the microphones, and on the current delay time of the voice signal to the microphones, that microphone whose signal is optimal as a basis for the operation of the voice-control system.

10 Claims, 2 Drawing Sheets

| $corr_{12}$ | $lag_{12}\mu s$ | $corr_{23}$ | $lag_{23}\mu s$ | $E_1$ | $E_2$ | $E_3$ | Mic |
|---|---|---|---|---|---|---|---|
| | | >0.7 | 122-400 | | $<E_3$ | $>t$ | 3 |
| >0.7 | 121-400 | | | $<E_2$ | $>t$ | $<E_2$ | 2 |
| >0.5 | -185-121 | | | $>t$ | $<E_1$ | | 1 |

MOTOR-VEHICLE VOICE-CONTROL SYSTEM AND MICROPHONE-SELECTING METHOD THEREFOR

FIELD OF THE INVENTION

The present invention relates to a motor-vehicle voice-control system. More particularly this invention concerns such a system and a microphone-selecting method therefor.

BACKGROUND OF THE INVENTION

A motor-vehicle voice-control system for motor vehicles has a plurality of microphones in the motor vehicle, preferably on a seat belt of the motor vehicle, and an evaluation unit that can select one of the microphones as a basis for the operation of the voice-control system depending on the acoustic conditions in the motor vehicle. Such a system employs a microphone-selection process.

Voice-control systems of this type provide additional comfort in the motor vehicle. A comparatively high voice quality can be achieved by the arrangement of the microphones on or in the seat belt and the associated reduction of the spacing between microphone and mouth. The signal and sound spacing is reduced to approx 10 cm, so that undesirable and interfering background noise can be reduced to a minimum. Communication is thus easily possible even with an open window and/or open sunroof or even in an open convertible. Furthermore, the best possible positioning of the microphone used as a basis for the operation of the voice-control system results in a considerably reduced distraction of the vehicle driver, for example, during a telephone call.

The best-positioned microphone of the voice-control system is selected depending on the height of the vehicle driver and his seated position. The selection and the activation of this microphone are thereby carried out by an evaluation unit of the voice-control system. A voice-control system of this type for motor vehicles or a corresponding method for selecting the best-suited microphone is described in a similar manner in DE 198 18 608.

OBJECTS OF THE INVENTION

It is therefore an object of the present invention to provide an improved voice-control system and microphone-selecting method.

Another object is the provision of such an improved voice-control system that overcomes the above-given disadvantages, in particular that achieves with respect to the selection of the optimal microphone for the operation of the voice-control system a considerably increased accuracy with short reaction time compared to the prior art.

SUMMARY OF THE INVENTION

A voice-control system for motor vehicles has according to the invention a plurality of spaced microphones emitting respective microphone signals, and an evaluation unit connected to the microphones. This unit serves for assembling correlation pairs from the signals of two of the microphones, calculating a correlation coefficient for each correlation pair, detecting an energy value for each microphone, detecting a respective delay time of a voice signal between a voice signal source and the each of the microphones, and selecting in dependence on current correlation coefficients of the correlation pairs, on the current energy values of the microphones, and on the current delay time of the voice signal to the microphones, that microphone whose signal is optimal as a basis for the operation of the voice-control system.

In other words, the object is attained with respect to the voice-control system for motor vehicles in that correlation pairs can be assembled from the signals of two microphones in the evaluation unit, that a correlation coefficient for each correlation pair can be calculated in the evaluation unit, that an energy value can be detected for each microphone in the evaluation unit, that the delay time of a voice signal between a voice signal source and the microphone can be detected for each microphone in the evaluation unit, and that, depending on the current correlation coefficients of the correlation pairs, on the current energy values of the microphones and on the current delay time of the voice signal to the microphones, that microphone can be selected in the evaluation unit, the signal of which microphone is optimal as a basis for the operation of the voice-control system. Based on the combined consideration of the correlation coefficients, the delay times and the energy, the microphone best suited for the operation of the voice-control system is selected with high accuracy and in a very short reaction time in the selection of the optimal microphone for the operation of the voice-control system. In the case of an interfering environment in the interior of the motor vehicle, which has an effect in terms of energy on the microphones, the correlation coefficient or the correlation coefficients are influenced considerably; the accuracy rate in switching over between microphones is thus very high, wherein switching over can be carried out largely free from errors.

In an advantageous embodiment of the voice-control system according to the invention, three microphones are provided, wherein in the evaluation unit a first correlation pair can be assembled from the signal of the first microphone and the signal of the second microphone, in the evaluation unit a second correlation pair can be assembled from the signal of the second microphone and the signal of the third microphone, in the evaluation unit in each case a correlation coefficient can be calculated for both correlation pairs, in the evaluation unit an energy value can be detected for each of the three microphones, in the evaluation unit the delay time of the voice signal between the voice signal source and the microphone can be detected for each of the three microphones, in the evaluation unit a delay time difference between the delay time of the voice signal from the voice signal source to the second microphone and to the first microphone can be calculated for the first correlation pair and a delay time difference between the delay time of the voice signal from the voice signal source to the third microphone and to the second microphone can be calculated for the second correlation pair, and in the evaluation unit, depending on the correlation coefficients of the two correlation pairs, on the current energy values of the microphones and the current delay time differences, that microphone can be selected, the signal of which is currently optimal as a basis for the operation of the voice-control system.

According to an advantageous further development, the correlation coefficient of each correlation pair can be determined in that the two signals of the microphones of each correlation pair can be processed by a window function, preferably a Hann window function, in that a fast Fourier transform can be carried out for the two processed signals, in that a cross spectrum can be determined from the two transformed signals, in that the determined cross spectrum can be subjected to a frequency weighting, in that the energy values from the two transformed signals can be calculated, in that mean values for the energy values of the two signals and for the frequency-weighted cross spectrum can be calculated, in that the frequency-weighted and averaged cross spectrum can be subjected to an inverse fast Fourier transform and can be processed to a covariance function, in that a maximum can be determined from the covariance function, and in that the maximum determined from the covariance function can be divided by the root of the product from the averaged energy values of the two signals.

A voice-control system of this type according to the invention has proven to be particularly advantageous, in the evaluation unit of which it can be determined whether the correlation coefficient of the first correlation pair is above a first threshold value, for example 0.5, and above a second threshold value for example 0.7, whether the correlation coefficient of the second correlation pair is above a third threshold value, for example 0.7, whether the delay time difference of the microphones of the first correlation pair is between 121 µs and 400 µs or between −185 µs and 121 µs, whether the delay time difference of the microphones of the second correlation pair is between 122 µs and 400 µs, whether the energy value of the first microphone is lower than the energy value of the second microphone, whether the energy value of the first microphone is higher than its predetermined energy threshold value, whether the energy value of the second microphone is lower than the energy value of the third microphone, whether the energy value of the second microphone is higher than the predetermined energy threshold value, whether the energy value of the second microphone is lower than the energy value of the first microphone, whether the energy value of the third microphone is higher than the predetermined energy threshold value and whether the energy value of the third microphone is lower than the energy value of the second microphone.

To attain the object on which the invention is based, furthermore, a method for selecting a microphone from several microphones of a voice-control system provided in a motor vehicle, preferably on a seatbelt of the same, for operating the voice-control system is proposed, in which one of the microphones is selected as the basis for the operation of the voice-control system depending on the acoustic conditions in the interior of the motor vehicle, wherein correlation pairs are assembled from the signals of two microphones, a correlation coefficient is calculated for each correlation pair, an energy value is detected for each microphone, the delay time of a voice signal between a voice signal source and the microphone is detected for each microphone, and depending on the current correlation coefficients of the correlation pairs, on the current energy values of the microphones and on the current delay times of the voice signal to the microphones, that microphone is selected, the signal of which is currently optimal as the basis for the operation of the voice-control system. According to an advantageous embodiment, the method according to the invention is realized by three microphones, wherein a first correlation pair is assembled from the signal of the first microphone and the signal of the second microphone, a second correlation pair is assembled from the signal of the second microphone and the signal of the third microphone, in each case a correlation coefficient is calculated for the first correlation pair and the second correlation pair, for each microphone an energy value is detected, the delay time of the voice signal between the voice signal source and the microphone is detected for each microphone, the delay time difference between the delay time of the voice signal from the voice signal source to the second microphone and to the first microphone is calculated for the first correlation pair, the delay time difference between the delay time of the voice signal from the voice signal source to the third microphone and to the second microphone is calculated for the second correlation pair, and depending on the correlation coefficients of the two correlation pairs, on the current energy values of the microphones and the current delay time differences, that microphone is selected, the signal of which is currently optimal as a basis for the operation of the voice-control system. By taking into consideration delay time differences, the different delay times of the voice signal between the voice signal source on the one hand and the microphones on the other hand can be taken into account in the selection of the optimal microphone for the operation of the voice-control system with a comparatively low expenditure in terms of control engineering.

According to an advantageous embodiment of the method according to the invention, the correlation coefficient of each correlation pair is determined, in that the two signals of the microphones of each correlation pair are processed by a window function, in particular a Hann window function, in that a fast Fourier transform is carried out for the two processed signals, in that a cross spectrum is determined from the two transformed signals, in that the determined cross spectrum is subjected to a frequency weighting, in that the energy values from the two transformed signals are calculated, in that mean values for the energy values of the two signals and for the frequency-weighted cross spectrum are calculated, in that the frequency-weighted and averaged cross spectrum is subjected to an inverse fast Fourier transform and is processed to a covariance function, in that a maximum is determined from the covariance function, and in that the maximum determined from the covariance function is divided by the root of the product from the averaged energy values of the two signals.

The method according to the invention can be carried out with a high reliability and accuracy if it is determined whether the correlation coefficient of the first correlation pair is above a first threshold value, for example 0.5, and above a second threshold value, for example 0.7, whether the correlation coefficient of the second correlation pair is above a third threshold value, for example 0.7, whether the delay time difference of the microphones of the first correlation pair is between 121 µs and 400 µs or between −185 µs and 121 µs, whether the delay time difference of the microphones of the second correlation pair is between 122 µs and 400 µs, whether the energy value of the first microphone is lower than the energy value of the second microphone, whether the energy value of the first microphone is higher than a predetermined energy threshold value, whether the energy value of the second microphone is lower than the energy value of the third microphone, whether the energy value of the second microphone is higher than the predetermined energy threshold value, whether the energy value if the second microphone is lower than the energy value of the first microphone, whether the energy value of the third microphone is higher than the predetermined energy threshold value and whether the energy value of the third microphone is lower than the energy value of the second microphone. In an advantageous embodiment of the method according to the invention the third microphone is selected or retained for the operation of the voice-control system if the correlation coefficient of the second correlation pair is above the third threshold value, the delay time difference of the microphones of the second correlation pair is between 122 µs and 400 µs, the energy value of the second microphone is lower than the energy value of the third microphone and the energy value of the third microphone is higher than the predetermined energy threshold value. In a further development of the method according to the invention, the second microphone is selected or retained for the operation of the voice-control system if the correlation coefficient of the second correlation pair is not above the third threshold value, the delay time difference of the microphones of the second correlation pair is not between 122 µs and 400 µs, the energy value of the second microphone is not lower than the energy value of the third microphone or the energy value of the third microphone is not higher than the predetermined energy threshold value, and if the correlation coefficient of the first correlation pair is above the second threshold value, the delay time difference of the microphones of the first correlation pair is between 121 µs and 400 µs, the energy value of the first microphone is lower than the energy value of the second microphone, the energy value of the second microphone is higher than the predetermined energy threshold value and the energy value of the third microphone is lower than the energy value of the second microphone.

In another further development of the method according to the invention the first microphone is selected or retained for the operation of the voice-control system if the correlation coefficient of the second correlation pair is not above the third threshold value, the delay time difference of the microphones of the second correlation pair is not between 122 µs and 400 µs, the energy value of the second microphone is not lower than the energy value of the third microphone, or the energy value of the third microphone is not higher than the predetermined energy threshold value, if the correlation coefficient of the first correlation pair is not above the second threshold value, the delay time coefficient of the microphones of the first correlation pair is not between 121 µs and 400 µs, the energy value of the first microphone is not lower than the energy value of the second microphone, the energy value of the second microphone is not higher than the predetermined energy threshold value or the energy value of the third microphone is not lower than the energy value of the second microphone and if the correlation coefficient of the first correlation pair is above the first threshold value, the delay time difference of the microphones of the first correlation pair is between −185 µs and 121 µs, the energy value of the first microphone is higher than the predetermined energy threshold value and the energy value of the second microphone is lower than the energy value of the first microphone.

According to another advantageous further development of the method according to the invention, the microphone already selected for the operation of the voice-control system is retained if the correlation coefficient of the second correlation pair is not above the third threshold value, the delay time difference of the microphones of the second correlation pair is not between 122 µs and 400 µs, the energy value of the second microphone is not lower than the energy value of the third microphone or the energy value of the third microphone is not higher than the predetermined energy threshold value, if the correlation coefficient of the first correlation pair is not above the second threshold value, the delay time difference of the microphones of the first correlation pair is not between 121 µs and 400 µs, the energy value of the first microphone is not lower than the energy value of the second microphone, the energy value of the second microphone is not higher than the predetermined energy threshold value or the energy value of the third microphone is not lower than the energy value of the second microphone, and if the correlation coefficient of the first correlation pair is not above the first threshold value, the delay time difference of the microphones of the first correlation pair is not between −185 µs and 121 µs, the energy value of the first microphone is not higher than the predetermined energy threshold value, or the energy value of the second microphone is not lower than the energy value of the first microphone.

BRIEF DESCRIPTION OF THE DRAWING

The above and other objects, features, and advantages will become more readily apparent from the following description, reference being made to the accompanying drawing in which.

DETAILED DESCRIPTION

Figure 1:
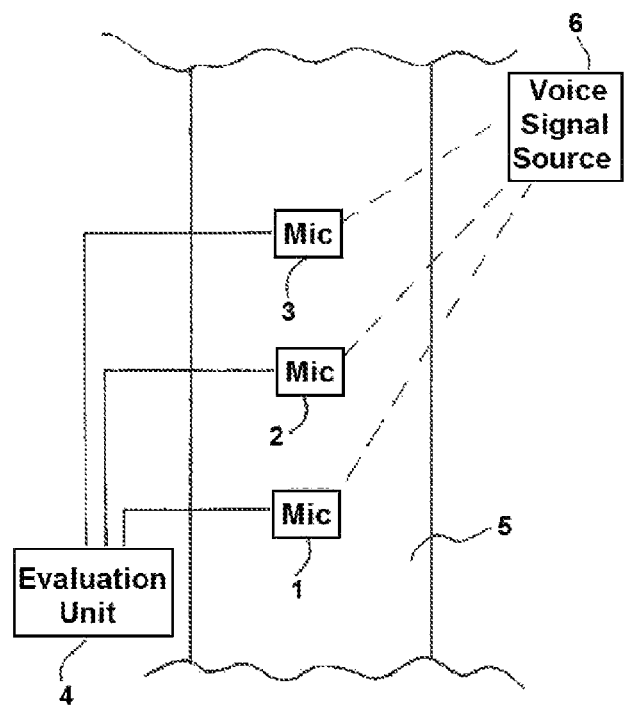
FIG. 1 is a schematic diagram of an embodiment of a voice-control system according to the invention for motor vehicles.

As seen in FIG. 1 a motor-vehicle voice-control system according to the invention has a first microphone 1, a second microphone 2, a third microphone 3 and an evaluation unit 4.

The evaluation unit 4 provided at a suitable point on the motor vehicle determines which of the microphones 1, 2, 3 is optimally positioned to act as a basis for the operation of the voice-control system. The voice-control system according to the invention can be used, for example, in the utilization of a hands-free system, in the acoustic entry of data into a telephone or navigation system or the like. The object of the voice-control system according to the invention is to select within the shortest time possible the microphone 1, 2, 3 that provides the best signal Mic1, Mic2, Mic3 for the operation of the voice-control system according to the invention.

In the embodiment shown diagrammatically in FIG. 1, the three microphones 1, 2, 3 are provided on a seatbelt 5 of the motor vehicle. The microphones 1, 2, 3 are provided at a spacing from one another longitudinally of the seatbelt 5. In the diagrammatic representation shown in FIG. 1, the connection of the microphones 1, 2, 3 to the evaluation unit 4 is shown merely diagrammatically. In reality the corresponding connection lines run longitudinally in the seatbelt and are connected, for example, by a belt end fitting, not shown in FIG. 1, to the evaluation unit 4 provided, for example, at a suitable point in the vehicle.

The acoustic voice signal emitted by a voice signal source 6 is detected by the microphones 1, 2, 3. Depending on the position of the microphones 1, 2, 3 with respect to the voice signal source 6 and depending on the noise conditions in the interior of the motor vehicle, one of the microphones 1, 2, 3 supplies an optimal signal Mic1, Mic2, Mic3 for the operation of the voice-control system.

The evaluation unit 4 is embodied such that in it correlation pairs 1, 2; 2, 3 can be assembled from the signals Mic1, Mic2, Mic3 of two microphones 1, 2, 3. A correlation coefficient $corr_{12}$, $corr_{23}$ can be calculated for each of these two correlation pairs formed in the case of the described embodiment of the voice-control system in the evaluation unit 4. Furthermore, in the evaluation unit 4 of the voice-control system for each microphone 1, 2, 3 the delay time of a voice signal emanating form the voice signal source 6 between the respective microphone 1, 2, 3 and the voice signal source 6 can be detected. Furthermore, an energy value $E_1$, $E_2$, $E_3$ of the first, second and third microphone 1, 2, 3 or the signals Mic1, Mic2, Mic3 relayed by these microphones 1, 2, 3 to the evaluation unit 4 can be detected in the evaluation unit 4.

The selection of the optimal microphone 1, 2, 3 for the operation of the voice-control system is now carried out in the evaluation unit 4 depending on the calculated correlation coefficients $corr_{12}$, $corr_{23}$, the energy values $E_1$, $E_2$, $E_3$ of the microphones 1, 2, 3 and the delay times of the voice signal from the voice signal source 6 to the microphones 1, 2, 3.

Figure 2:
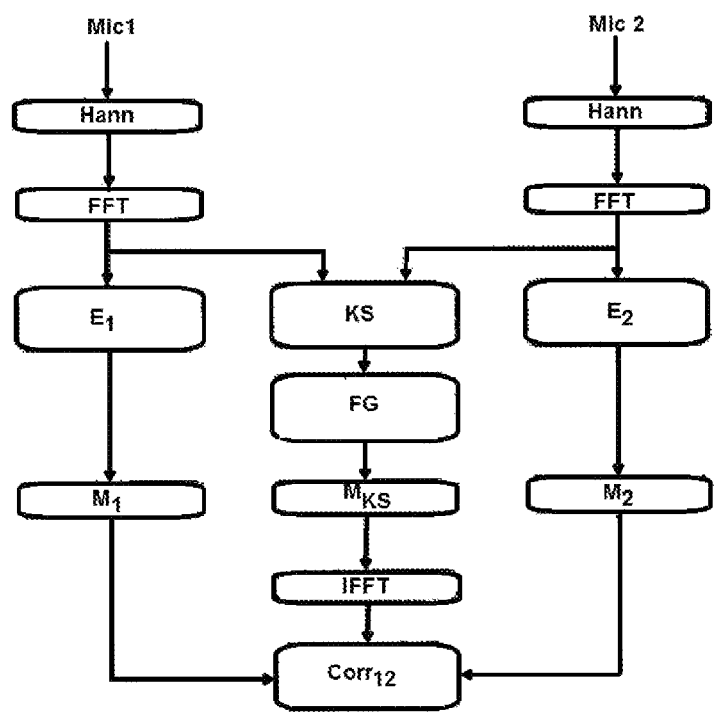
FIG. 2 is a block diagram of the sequence for determining a correlation coefficient.

The determination or calculation of the correlation coefficients $corr_{12}$, $corr_{23}$ is described in more detail below based on the correlation coefficient $corr_{12}$ with reference to the representation in FIG. 2. The determination of the correlation coefficient $corr_{23}$ is carried out analogously.

In the evaluation unit 4 in a first process step the signal Mic1 of the first microphone 1 and the signal Mic2 of the second microphone 2 are each processed by a Hann window function Hann. The two microphones 1, 2 form the correlation pair 1, 2. The two processed signals Mic1, Mic2 are subjected to a fast Fourier transform FFT. A cross spectrum KS is formed from the two transformed signals Mic1, Mic2. Furthermore, the energy values $E_1$, $E_2$ are calculated from the two transformed signals Mic1, Mic2. The cross spectrum KS determined from the two transformed signals Mic1, Mic2 is subjected to a frequency weighting FG. A mean value $M_1$, $M_2$, $M_{KS}$ is calculated for the energy value $E_1$ of the first microphone 1, for the energy value $E_2$ of the second microphone 2, and for the frequency-weighted cross spectrum KS. The frequency-weighted and averaged cross spectrum KS is subsequently subjected to an inverse fast Fourier transform IFFT and processed to a covariance function. A maximum is determined from the covariance function. The calculation of the correlation coefficient $corr_{12}$ is then carried out in that the maximum determined from the covariance function is divided by the root of the product from the determined energy values $E_1$, $E_2$ of the two signals Mic1, Mic2 of the two microphones 1, 2.

In the evaluation unit 4 of the voice-control system and in the method for selecting the optimal microphone 1, 2, 3 in the embodiment shown and described the correlation coefficient $corr_{12}$ of the first correlation pair 1, 2 formed from the signals Mic1, Mic2 of the first and the second microphone 1, 2, the correlation coefficient $corr_{23}$ of the second correlation pair 2, 3 from the signals Mic2, Mic3 of the two microphones 2, 3, the energy value $E_1$ of the first microphone 1 or of the signal Mic1, the energy value $E_2$ of the second microphone or of the signal Mic2, the energy value $E_3$ of the third microphone or of the signal Mic3, a delay time difference $lag_{12}$ between the delay time of the voice signal between the voice signal source 6 on the one hand and the first microphone 1 or the second microphone 2 on the other hand and a delay time difference $lag_{23}$ between the delay time of the voice signal from the voice signal source 6 on the one hand to the second microphone 2 or to the third microphone 3 on the other hand.

For the first correlation coefficient $corr_{12}$ a first threshold value, which in the embodiment is 0.5, and a second threshold value, which in the embodiment is 0.7, are stored in the evaluation unit 4. For the second correlation coefficient $corr_{23}$ a third threshold value, which in the embodiment is 0.7, is stored in the evaluation unit.

For the delay time difference $lag_{12}$, the evaluation unit 4 holds two ranges of which one in the embodiment is between 121 μs and 400 μs and the other in the embodiment is between −185 μs and 121 μs. For the delay time difference $lag_{23}$ in the evaluation unit 4 a range is stored, which in the embodiment is between 122 μs and 400 μs.

The evaluation unit 4 holds an energy threshold value t that is to be taken into consideration with reference to the energy values $E_1$, $E_2$, $E_3$ of the signals Mic1, Mic2, Mic3 of the three microphones 1, 2, 3.

Figures 3, 4:
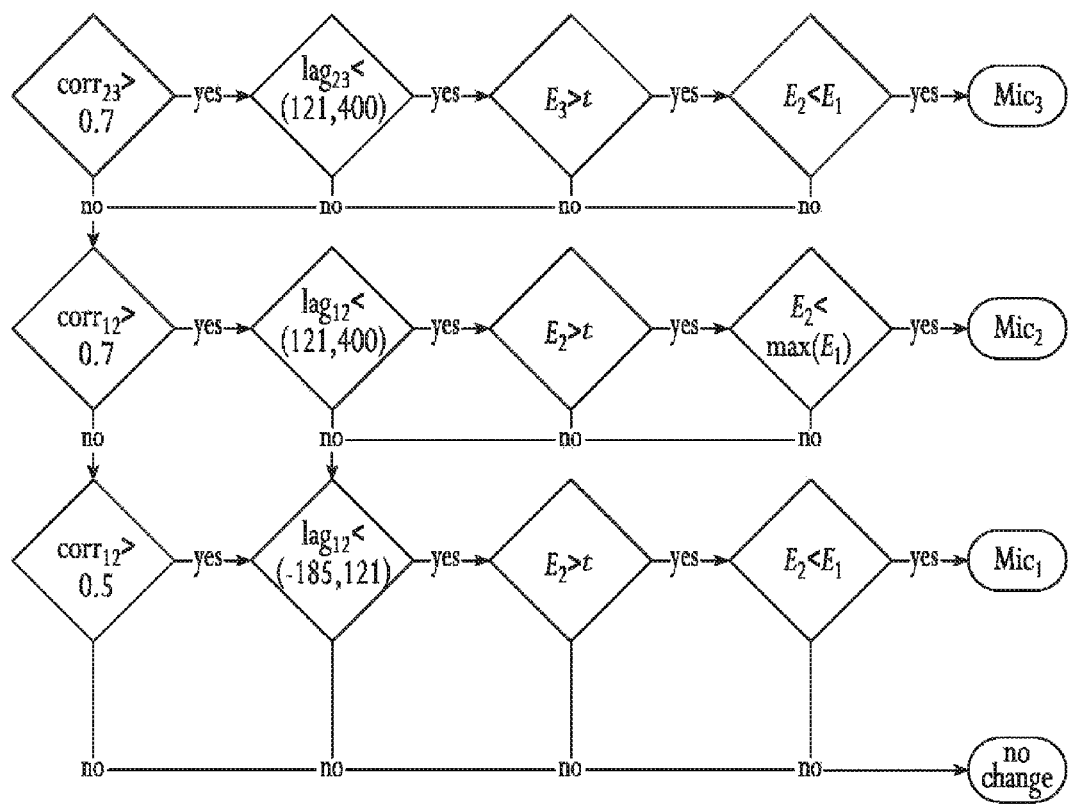
FIG. 3 is a decision table usable in an evaluation unit of the voice-control system according to the invention.
FIG. 4 is a flow chart for selecting an optimal microphone for the operation of the voice-control system according to the invention.

In the method for selecting the optimally suitable microphone 1, 2, 3 for the operation of the voice-control system shown based on the flow chart according to FIG. 4, the third microphone 3 is selected or retained for the operation of the voice-control system if the following four conditions are met:

The correlation coefficient $corr_{23}$ of the second correlation pair 2, 3 is above 0.7;

The delay time difference $lag_{23}$ of the microphones 2, 3 of the second correlation pair 2, 3 is between 122 μs and 400 μs;

The energy value $E_2$ of the second microphone 2 is lower than the energy value $E_3$ of the third microphone 3; and The energy value $E_3$ of the third microphone 3 is higher than the predetermined energy threshold value t.

The second microphone 2 is selected or retained for the operation of the voice-control system if one of the four above conditions is not met and if the five conditions listed below are met:

The correlation coefficient $corr_{12}$ of the first correlation pair 1, 2 is above 0.7;

The delay time difference $lag_{12}$ of the microphones 1, 2 of the first correlation pair 1, 2 is between 121 μs and 400 μs;

The energy value $E_1$ of the first microphone 1 is lower than the energy value $E_2$ of the second microphone;

The energy value $E_2$ of the second microphone 2 is higher than the predetermined energy threshold value t; and The energy value $E_3$ of the third microphone 3 is lower than the energy value $E_2$ of the second microphone 2.

The first microphone 1 is selected or retained for the operation of the voice-control system if at least one of the four first conditions listed above and at least one of the five following conditions given above is not met and if the four conditions given below are met:

The correlation coefficient $corr_{12}$ of the first correlation pair 1, 2 is above 0.5;

The delay time difference $lag_{12}$ of the microphones 1, 2 of the first correlation pair 1, 2 is between −185 μs and 121 μs;

The energy value $E_1$ of the first microphone 1 is higher than the predetermined energy threshold value t; and The energy value $E_2$ of the second microphone 2 is lower than the energy value $E_1$ of the first microphone 1.

In the operation of the voice-control system the microphone 1, 2, 3 in operation or selected is retained if at least one of the four conditions given first is not met, if at least one of the five conditions given second is not met and if at least one of the four conditions given last is not met.

With the method for selecting the optimally suited microphone 1, 2, 3 for the operation of the voice-control system described above an interfering environment, which has an effect in terms of energy on the microphones 1, 2, 3, has an influence on the respective correlation pair 1, 2 or 2, 3 and thus on the corresponding correlation coefficient $corr_{12}$ and $corr_{23}$. The correlation coefficients $corr_{12}$ and $corr_{23}$ are taken into consideration in the decision which of the microphones 1, 2, 3 is selected. The selection of the optimal microphone 1, 2, 3 or the accuracy rate in switching over between the microphones 1, 2, 3 can thus be carried out quickly and as largely as possible free from errors.

I claim:

1. A voice-control system for motor vehicles, the system comprising:
a first microphone, a second, and a third microphone spaced from each other and emitting respective microphone signals; and
an evaluation unit connected to the microphones for:
assembling a first correlation pair from the signals of the first microphone and of the second microphone and a second correlation pair from the signals of the second microphone and of the third microphone, calculating a respective correlation coefficient for the first and the second correlation pairs, detecting an energy value for each of the microphones, detecting a respective delay time of a voice signal between a voice signal source and each of the three microphones, calculating a delay time difference between the delay time of the voice signal from the voice signal source to the second microphone and to the first microphone for the first correlation pair and a delay time difference between the delay time of the voice signal from the voice signal source to the third microphone and to the second microphone for the second correlation pair, and selecting in dependence on current correlation coefficients of the correlation pairs, on the current energy values of the microphones, and on the current delay time of the voice signal to the microphones, that microphone whose signal is optimal as a basis for the operation of the voice-control system.

2. The voice-control system defined in claim 1, wherein the evaluation unit further serves to:

determine the correlation coefficient of each correlation pair by processing the two signals of the microphones of each correlation pair with a Hann window function and with a fast Fourier transform for the two processed signals to determine a cross spectrum from the two transformed signals, then subjecting the determined cross spectrum to a frequency weighting by calculating energy values from the two transformed signals and calculating mean values for the energy values the two signals and for the frequency-weighted cross spectrum, then subjecting the frequency-weighted and averaged cross spectrum to an inverse fast Fourier transform and processing it with a covariance function such that a maximum can be determined from the covariance function, and dividing the maximum determined from the covariance function by the root of the product from the averaged energy values of the two signals.

3. The voice-control system defined in claim 1, wherein the evaluation unit also determines whether:

the correlation coefficient of the first correlation pair is above a first threshold value and above a second higher threshold value, the correlation coefficient of the second correlation pair is above a third threshold value, the delay time difference of the microphones of the first correlation pair is between 121 µs and 400 µs or between −185 µs and 121 µs, the delay time difference of the microphones of the second correlation pair is between 122 µs and 400 µs, the energy value of the first microphone is lower than the energy value of the second microphone, the energy value of the first microphone is higher than a predetermined energy threshold value, the energy value of the second microphone is lower than the energy value of the third microphone, the energy value of the second microphone is higher than the predetermined energy threshold value, the energy value of the second microphone is lower than the energy value of the first microphone, the energy value of the third microphone is higher than the predetermined energy threshold value, and the energy value of the third microphone is lower than the energy value of the second microphone.

4. A method for selecting a microphone from spaced-apart first, second, and third microphones provided in a motor vehicle of a voice-control system for operating same, the method comprising the steps of:

assembling a first correlation pairs from the signals of the first and second microphones and a second correlation pair from the signals of the second and third microphones, calculating respective first and second correlation coefficients for the first and second correlation pairs, detecting an energy value for each microphone, detecting a respective delay time of a voice signal between a voice signal source and each of the microphones, and selecting, depending on the current correlation coefficients of the correlation pairs, on the current energy values of the microphones, and on the current delay times of the voice signal to the microphones that microphone whose signal is currently optimal as a basis for the operation of the voice-control system.

5. The method defined in claim 4, wherein the correlation coefficient of each correlation pair is determined by:

by processing the two signals of the microphones of each correlation pair with a Hann window function, carrying out a fast Fourier transform for the two processed signals to determine a cross spectrum from the two transformed signals to a frequency weighting calculating energy values from the two transformed signals and mean values for the energy values of the two signals and for the frequency-weighted cross spectrum, subjecting the frequency-weighted and averaged cross spectrum to an inverse fast Fourier transform and processing it to a covariance function, determining a maximum from the covariance function, and dividing the maximum determined from the covariance function by the root of the product from the averaged energy values of the two signals.

6. The method defined in claim 4, further comprising the steps of determining whether:

the correlation coefficient of the first correlation pair is above a first threshold value and above a second higher threshold value, the correlation coefficient of the second correlation pair is above a third threshold value, a delay time difference of the microphones of the first correlation pair is between 121 µs and 400 µs or between −185 µs and 121 µs, a delay time difference of the microphones of the second correlation pair is between 122 µs and 400 µs, the energy value of the first microphone is lower than the energy value of the second microphone, the energy value of the first microphone is higher than a predetermined energy threshold value, the energy value of the second microphone is lower than the energy value of the third microphone, the energy value of the second microphone is higher than the predetermined energy threshold value, the energy value of the second microphone is lower than the energy value of the first microphone, the energy value of the third microphone is higher than the predetermined energy threshold value, and the energy value of the third microphone is lower than the energy value of the second microphone.

7. The method defined in claim 6, further comprising the step of selecting the third microphone for operation of the voice-control system if the correlation coefficient of the second correlation pair is above the third threshold value, the delay time difference of the microphones of the second correlation pair is between 122 µs and 400 µs, the energy value of the second microphone is lower than the energy value of the third microphone, and the energy value of the third microphone is higher than the predetermined energy threshold value.

8. The method defined in claim 6, further comprising the steps of:

selecting the second microphone for operation of the voice-control system if the correlation coefficient of the second correlation pair is not above the third threshold value, the delay time difference of the microphones of the second correlation pair is not between 122 µs and 400 µs, and the energy value of the second microphone is not lower than the energy value of the third microphone or the energy value of the third microphone is not higher than the predetermined energy threshold value, and if the correlation coefficient of the first correlation pair is above the second threshold value, the delay time difference of the microphones of the first correlation pair is between 121 µs and 400 µs, the energy value of the first microphone is lower than the energy value of the second microphone, the energy value of the second microphone is higher than the predetermined energy threshold value, and the energy value of the third microphone is lower than the energy value of the second microphone.

9. The method according to claim 6, further comprising the step of selecting the first microphone for operation of the voice-control system if the correlation coefficient of the second correlation pair is not above the third threshold value, the delay time difference of the microphones of the second correlation pair is not between 122 µs and 400 µs, and the energy value of the second microphone is not lower than the energy value of the third microphone or the energy value of the third microphone is not higher than the predetermined energy threshold value, if the correlation coefficient of the first correlation pair is not above the second threshold value, the delay time coefficient of the microphones of the first correlation pair is not between 121 µs and 400 µs, the energy value of the first microphone is not lower than the energy value of the second microphone, and the energy value of the second microphone is not higher than the predetermined energy threshold value or the energy value of the third microphone is not lower than the energy value of the second microphone, and if the correlation coefficient of the first correlation pair is above the first threshold value, the delay time difference of the microphones of the first correlation pair is between −185 µs and 121 µs, the energy value of the first microphone is higher than the predetermined energy threshold value, and the energy value of the second microphone is lower than the energy value of the first microphone.

10. The method according to claim 6, further comprising the step of:

retaining the microphone selected for operation of the voice-control system if the correlation coefficient of the second correlation pair is not above the third threshold value, the delay time difference of the microphones of the second correlation pair is not between 122 µs and 400 µs, and the energy value of the second microphone is not lower than the energy value of the third microphone or the energy value of the third microphone is not higher than the predetermined energy threshold value, if the correlation coefficient of the first correlation pair is not above the second threshold value, the delay time difference of the microphones of the first correlation pair is not between 121 µs and 400 µs, the energy value of the first microphone is not lower than the energy value of the second microphone, and the energy value of the second microphone is not higher than the predetermined energy threshold value or the energy value of the third microphone is not lower than the energy value of the second microphone, and if the correlation coefficient of the first correlation pair is not above the first threshold value, the delay time difference of the microphones of the first correlation pair is not between −185 µs and 121 µs, and the energy value of the first microphone is not higher than the predetermined energy threshold value or the energy value of the second microphone is not lower than the energy value of the first microphone.

\* \* \* \* \*